United States Patent [19]
Cloup

[11] Patent Number: 4,785,713
[45] Date of Patent: Nov. 22, 1988

[54] DRIVING DEVICE, IN PARTICULAR FOR A PROPORTIONING PUMP OF THE PISTON-FLOWMETER TYPE

[76] Inventor: Jean Cloup, Beaugey, Carignan, 33360, France

[21] Appl. No.: 899,050

[22] Filed: Aug. 22, 1986

[30] Foreign Application Priority Data

Sep. 5, 1985 [FR] France .................... 8513200

[51] Int. Cl.[4] ............................... F01L 23/00
[52] U.S. Cl. .................... 91/341 R; 91/344; 91/350; 137/624.14; 251/75; 92/7
[58] Field of Search .............. 91/341 R, 344, 350; 137/624.14 R; 251/75; 417/403; 92/7

[56] References Cited

U.S. PATENT DOCUMENTS

| | | | |
|---|---|---|---|
| 546,096 | 10/1885 | Frizell | 92/7 |
| 1,507,821 | 9/1924 | Folberth | 251/75 |
| 2,222,141 | 11/1940 | Denison | 251/75 |
| 3,053,435 | 9/1962 | Sanders | 417/403 |
| 3,882,900 | 5/1975 | Williams | 251/61.3 |
| 4,558,719 | 12/1985 | Rinkewich | 137/624.14 |

FOREIGN PATENT DOCUMENTS 381812  9/1970  U.S.S.R. .................... 251/75

Primary Examiner—Robert E. Garrett
Assistant Examiner—Thomas Denion
Attorney, Agent, or Firm—Murray and Whisenhunt

[57] ABSTRACT

In a driving device of the piston-flowmeter type, in particular for a proportioning pump, a distributor is mounted at one end of a piston cylinder for controlling the admission and discharge of fluid within two chambers formed respectively on each side of the piston. The distributor body is provided with circular flow passages and two pairs of valve-seats in cooperating relation with two seals of a two-position tubular valve. The valve has a central bore traversed by the piston rod and coupled to a resilient bistable mechanism for reversing the state of the valve and maintaining it in either of its two positions.

7 Claims, 2 Drawing Sheets 4,785,713

DRIVING DEVICE, IN PARTICULAR FOR A PROPORTIONING PUMP OF THE PISTON-FLOWMETER TYPE

BACKGROUND OF THE INVENTION

1. Field of the Invention

This invention relates to a driving device, in particular for a proportioning pump of the piston-flowmeter type.

2. Description of the Prior Art

It is already a known practice to drive a proportioning pump by means of a positive-displacement machine which utilizes the energy of the main fluid stream into which an additive product to be measured is introduced. The disadvantage of this system, however, lies in the fact that its overall size and bulk become excessive whenever the process fluid has to pass through the meter at high flow rates.

In a known arrangement disclosed in particular in U.S. Pat. No. 3,053,435, a fluid motor serves to control a compressor for providing pressure compensation of a pressurized reservoir. The motor is constituted by a differential cylinder-piston assembly associated with a two-position four-way distributor, the changes of state of which are mechanically controlled by the moving system of the motor. This construction is complex, however, since it calls for the presence of an abutment for actuating the distributor beyond the distributor body, which is not conducive to small overall size of the device.

The device proposed in the present invention is similar to the system described in the patent cited in the foregoing except for the fact that the distributor control mechanism is entirely housed within the motor and is of much more simple design.

SUMMARY OF THE INVENTION

To this end, the invention is accordingly directed to a driving device of the piston-flowmeter type, especially for a proportioning pump, said device being constituted by:

a cylinder, a piston which is slidably mounted within the cylinder, which is provided with at least one motion transmission rod, and which divides the cylinder into two chambers located on each side of the piston, a two-position four-way distributor controlled by the moving system of rod and piston so that, in a first position, a communication is established between one of the chambers aforesaid and a supply of fluid under pressure whilst a communication is established between the other chamber and an outlet nozzle and so that, in a second position, a communication is established between the second chamber and said fluid supply whilst a communication is established between the first chamber and said discharge nozzle.

Said distributor is provided within a body with two pairs of fixed valve-seats located in concentric relation to a direction which is coaxial with the transmission rod and with a tubular valve traversed by said rod, said valve being provided at the ends thereof with two peripheral seals for cooperating alternately with each pair of fixed valve-seats.

In accordance with one of the main distinctive features of the invention, said tubular valve is capable of cooperating in tightly applied relation with at least one valve-seat of each pair which constitutes an end-of-travel stop for the valve whilst two fixed abutments are provided for a slide-block mounted on the rod and coupled to the valve by means of a bistable resilient mechanism having a point of reversal which tends to move the valve away from the slide-block in a first position and to move said valve towards said slide-block in a second position. Two abutments are rigidly fixed to the rod in order to move the slide-block in the vicinity of the top and bottom dead centers of the piston away from the bearing surface on which it is applied by the resilient mechanism and to cause displacement of said slide-block until it passes beyond the point of reversal of the mechanism.

In one embodiment, the bistable resilient mechanism having a point of reversal comprises two opposite link-arms pivotally attached to said slide-block at one end and an elastically deformable component having the general shape of a U, the base of which is rigidly fixed to the valve and each arm of which is pivotally attached to the other end of the corresponding link-arm. The assembly of components and link-arms forms a polygon in which the slide-block constitutes a convex summit in the first position and a concave summit in the second position.

Preferably, the U-shaped component is constituted by a frame spring consisting of two parallel U-shaped lateral elements of resilient wire secured to the valve by means of their bases, and by two cross-pins located at right angles to the lateral elements and adapted to connect the corresponding arms of the U-shaped elements, the link-arms aforesaid being pivotally attached to said cross-pins.

Finally, in this mode of construction, simplicity of assembly as well as large cross-sectional areas of flow will be obtained by virtue of the fact that the cylinder aforesaid is constituted by a sleeve, one end of which is closed by the distributor body and the other end of which opens into the internal space of a bell-shaped casing which covers said sleeve and is closed by the distributor body in fluid-tight manner. Said distributor body has orifices for establishing a direct communication on the one hand with the adjacent cylinder chamber and on the other hand with the annular space provided between the sleeve and the casing.

Thus the flowmeter in accordance with the invention utilizes forms and means of construction which permit the achievement of a high flow rate in respect of a small overall size of the apparatus.

Furthermore, the design concept is such that simple shapes are utilized for the manufacture of the flowmeter in accordance with the invention.

BRIEF DESCRIPTION OF THE DRAWINGS

These and other features of the invention will be more apparent to those versed in the art upon consideration of the following description and accompanying drawings, wherein.

DETAILED DESCRIPTION OF THE INVENTION

Figure 1:
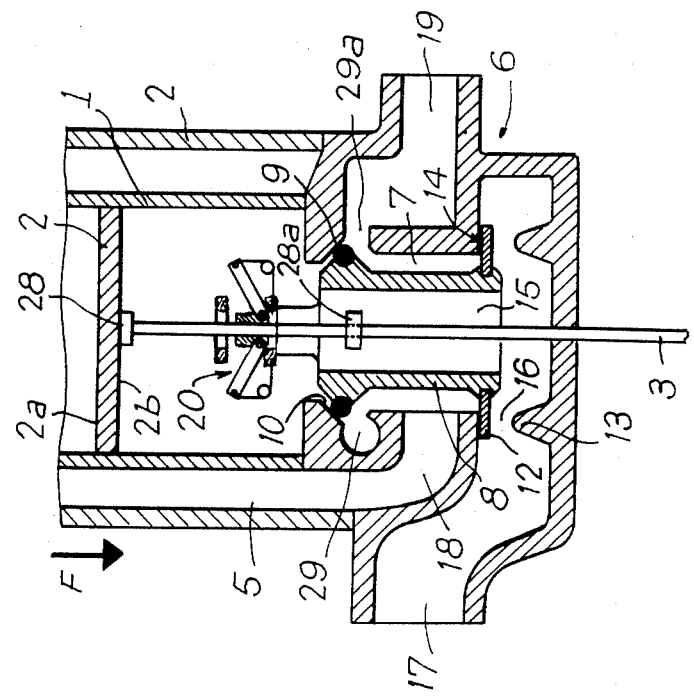
FIG. 1 is a longitudinal sectional view of one embodiment of a flowmeter in accordance with the invention.

The flowmeter which can be employed as a fluid motor, in particular for a proportioning pump as shown in FIG. 1, has a cylindrical sleeve 1, a piston 2 displaceable within said cylinder being secured to one end of a rod 3 for actuating a proportioning pump (not shown in the drawings). A casing 4 placed around the cylindrical sleeve defines an annular space 5 for circulation of fluid towards one of the open ends of the sleeve 1 and one of the faces 2a of the piston.

The body 6a of a distributor 6 having four passageways 17-18-19 and 19a and two positions for supplying the cylindrical sleeve on both faces of the piston is removably fixed on the assembly formed by the cylindrical sleeve 1 and casing 4.

Said cylindrical sleeve 1 is preferably made of glass, thus ensuring freedom from wear and permitting an extremely low coefficient of friction with the piston 2 which is made of suitable material.

The distributor body 6a which has the same cylindrical shape as the casing 4 has a central bore 7 in which is mounted an axially displaceable tubular valve 8 fitted at one end with a rigid seal 9. Said seal is intended to come into contact with two valve-seats 10 and 11 and to limit the range of travel of said valve.

The tubular valve 8 is fitted at the other end with a flexible seal 12 which is capable of being applied against a valve-seat 13 formed on the bottom end-wall of the casing and against a valve-seat 14 provided around the central bore 7 of the casing.

The piston rod 3 passes through the distributor body 6a, within the bore 15 of the tubular valve 8, and extends to the exterior of said distributor body.

The bore 7 of the distributor communicates with a fluid inlet nozzle 17 via a flow orifice 16 and communicates with the annular space 5 via a flow duct 18.

Thus, depending on the position of the tubular valve 8, that is to say depending on whether said valve is in contact with the valve-seat 12 or with the valve-seat 14, the inlet nozzle 17 communicates either with the duct 18 or with the valve bore 15; said bore opens directly into the passageway 19a and this latter in turn opens directly into the cylindrical-sleeve chamber which is located on the same side as the face 2b of the piston 2.

Moreover, depending on the position of the valve 8, the fluid outlet nozzle 19 communicates selectively either with the bore 7 or via the passageway 19a with the cylindrical-sleeve chamber which is located on the same side as the face 2b of the piston 2 and with a chamber 25 of the distributor body.

Figure 3:
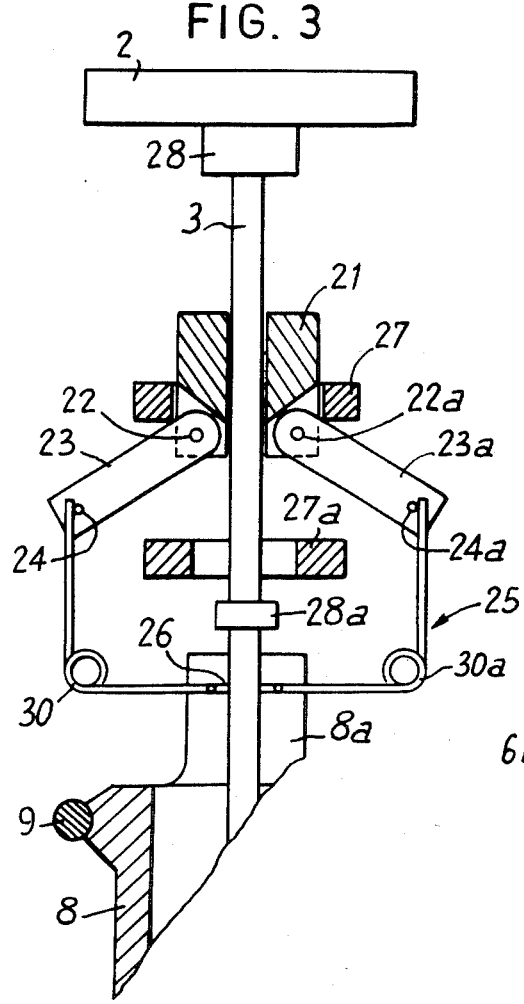
FIG. 3 is a schematic view in sectional elevation showing the toggle-action valve-reversing device.

The valve 8 is coupled to a slide-block 21 of a bistable resilient mechanism 20 having a point of reversal as illustrated to a larger scale in FIG. 3. The design function of this mechanism is to control the change of state of closure of the distributor valves and to maintain this state during the greater part of each outward or return stroke of the piston 2.

Figure 4:
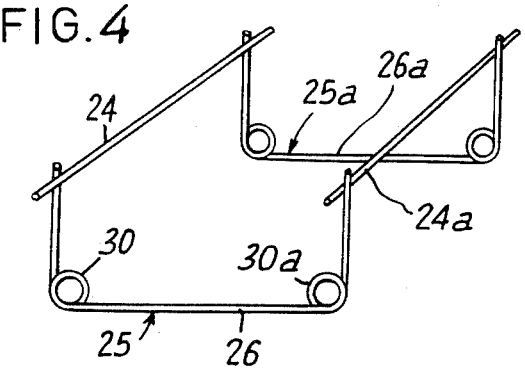
FIG. 4 is a perspective view showing the frame spring of the toggle-action valve-reversing device.

Thus the slide-block 21 is freely mounted along the transmission rod 3 and adapted to carry two pivot-pins 22 and 22a on which is pivotally mounted one end of each link-arm 23 and 23a respectively. The other end of each link-arm is pivoted at 24 and 24a to a component 25 having the shape of a U when looking from the front as shown in FIG. 3. In fact, as shown in FIG. 4, said component is made up of two U-shaped spring elements 25 and 25a, the vertical arms of which are capable of moving elastically towards and away from each other. In order to increase the elasticity of said spring arms, provision has been made at each corner of the U for resilient loops such as the loops 30, 30a. Provision will preferably be made for multiple loops although a U-base without any loop may also be contemplated. The two elements 25 and 25a are joined to each other by means of coupling cross-pins 24, 24a which constitute pivot-pins for the second ends of the link-arms.

The frame spring thus formed is coupled by any known means to an extension 8a of the tubular valve 8 by means of the central zone 26, 26a of each base of the U of the elements 25, 25a.

Figure 2:
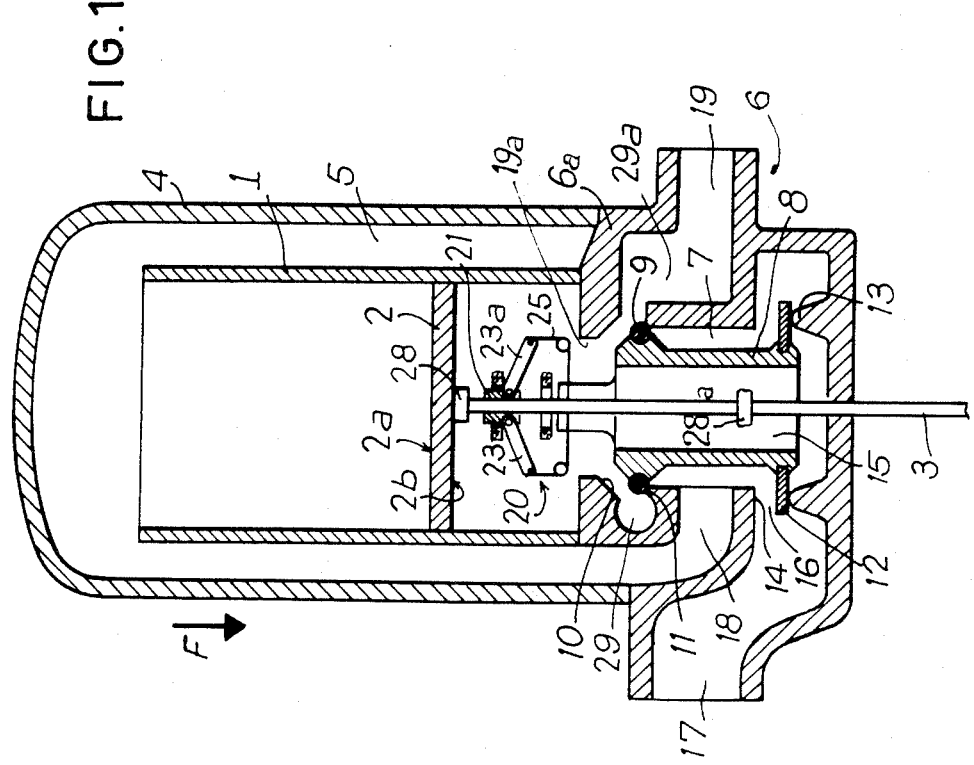
FIG. 2 is a longitudinal sectional view of the distributor and of the tubular valve in a position which is reversed with respect to the position shown in FIG. 1.

It is apparent from FIGS. 1, 2 and 3 that the resilient mechanism can assume two configurations, namely a configuration in the shape of a polygon (pentagon) which is convex at the summit or vertex formed by the slide-block 21 (FIGS. 1 and 3) or which is concave at the same summit (FIG. 2). A change-over from one configuration to the other is carried out by moving the slide-block 21 towards or away from the base 26, 26a of the spring component, initially in opposition to the action of the arms of the U which tends to prevent this displacement up to a point at which the cross-pins 24, 24a and the pivot-pins 22, 22a are located in the same plane, then accompanies the movement beyond this point.

Figure 3A:
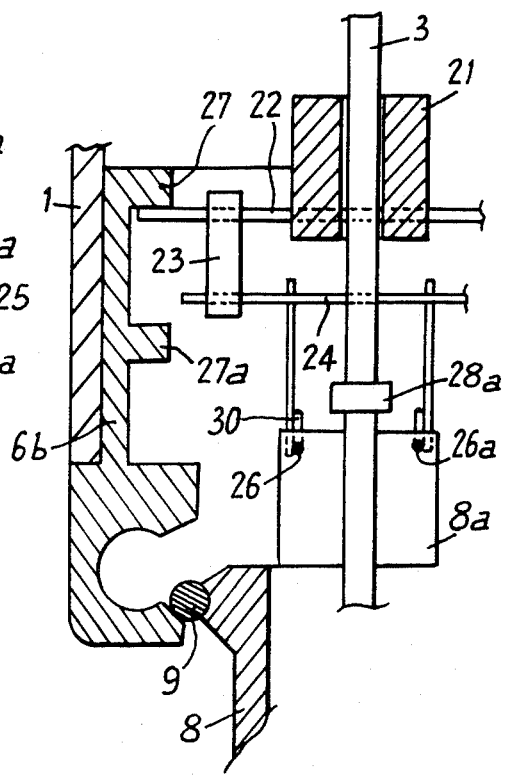
FIG. 3A is a fragmentary view illustrating a simple form of construction of the fixed abutments which cooperate with the slide-block.

Fixed abutments 27 and 27a are provided in the sleeve 1 as represented schematically at the center of said sleeve in order to be traversed by the piston rod 3. FIG. 3A illustrates in simplified form one possible mode of practical construction of the above-mentioned abutments 27 and 27a. Said abutments constitute bearing zones for the slide-block 21 in the two aforementioned configurations of the polygon. Thus in its convex polygon configuration, the slide-block 21 or the pivot-pins 22, 22a (as shown in FIG. 3A) are applied against the fixed abutment 27 whilst the seal 9 is applied against the valve-seat 11. The distance between the abutment 27 and the valve-seat 11 is shorter than the distance which would exist between the slide-block 21 and the seal 9 if the mechanism could assume its maximum extension in the free state. The result thereby achieved is that a residual force is applied to the valve 8 by the mechanism 20, thus tending to apply the seal 9 against the valve-seat 11.

In the concave polygon configuration of the mechanism as illustrated in FIG. 2, the slide-block 21 (or the pivot-pins of the link-arms 23, 23a) is applied against the abutment 27a whilst the seal 9 is stopped by the valve-seat 10. Since the distance between the abutment 27a and the valve-seat 10 is greater than the distance which would separate the slide-block 21 from the seal 9 if the mechanism 20 were free to reach its position of rest, there remains a residual force which tends to apply the seal 9 against the valve-seat 10.

It is apparent that this arrangement constitutes a mechanical "memory" for the two positions of the tubular valve 8 and that an external force has to be applied in order to change the state of said valve.

Said external force arises from the action of two fixed abutments 28 and 28a (annular shoulders in this example) provided on the piston rod 3 and located at a distance from each other which is substantially equal to the range of travel of the piston 2. Each abutment shoulder located respectively in the vicinity of the top and bottom dead-center positions of the piston strikes the slide-block 21 in order to displace this matter to a position beyond the point of reversal of the mechanism 20, namely the point beyond which said mechanism is applied against the other fixed abutment 27 or 27a under its resilient action and displaces the valve 8 from one valve-seat to the other.

It will be noted in this connection that it is possible to adjust the spacing between said abutment shoulders 28, 28a by making arrangements such that at least one of said abutment shoulders is positionally adjustable along the piston rod 3, thus permitting adjustment of the driving range of travel.

The flowmeter in accordance with the invention operates as follows: as shown in FIG. 1, the piston 2 moves in the direction of the arrow F and the valve 8 is applied against the seat 11 by means of its seal 9 and against the seat 13 by means of its seal 12. Thus the liquid under pressure which is admitted through the nozzle 17 is directed by the orifice 16 into the bore 7 via the duct 18 and via the annular space 5 into the cylinder 1 on the same side as the piston face 2a.

Furthermore, the liquid located on the same side as the piston face 2b escapes through the circular space 29 and the flow passage 29a towards the fluid outlet nozzle 19.

As soon as the piston 2 reaches its end of travel in the direction of the arrow F, the abutment 28 comes into contact with the slide-block 21 which had been applied against the fixed abutment 27 and which then slides along the rod 3 while displacing the pivot-pins 22 and 22a towards the valve. The frame spring remains stationary by virtue of the fact that the rigid seal 9 of the valve 8 is applied against the valve-seat 11. As soon as the pivot-pins have passed beyond the level of the cross-pins 24, 24a, the spring of the mechanism 20 abruptly draws the slide-block 21 against the fixed abutment 27a. Said slide-block is thus stopped in a similarly abrupt manner, thus setting-up a reaction throughout the mechanism, thereby moving the valve 8 away from the valve-seats 11 and 13 and applying said valve against the valve-seats 10 and 14. There then takes place a reversal of fluid supply to the chambers of the cylinder since the fluid admitted through the nozzle 17 is directed via the orifice 16 and the central bore 15 of the valve 8 to the space of the cylinder 1 which is located on the same side as the piston face 2b. In consequence, the piston undergoes a displacement in a direction opposite to the arrow F and the fluid within the cylinder on the same side as the piston face 2a flows through the annular space 5, through the duct 18, through the annular space formed between the valve 8 and the bore 7 of the distributor body 6a to the chamber, the space 29 and the fluid outlet nozzle 19.

This configuration is illustrated in FIG. 2.

As soon as the piston 2 reaches the end of its travel in the direction opposite to the arrow F, the abutment 28a comes into contact with the slide-block 21 which moves away from the bearing abutment 27a, deforms the concave polygon until it passes beyond the aforesaid point of reversal, which is made possible by the fact that the valve 8 is stopped by the valve-seat 10. After passing beyond the point of reversal, the slide-block causes the valve 8 to move towards the valve-seats 11 and 13 as a result of the reaction produced by the resilient force which has not yet been released.

FIG. 3A, in which elements already described are designated by the same references, shows diagrammatically a practical form of construction of the fixed abutments 27, 27a. These abutments are provided as flanges formed on an upper portion 6b of the distributor body 6a which constitutes a sleeve for centering the glass cylinder 1. Said flange-type abutments 27, 27a are adapted to cooperate with the ends of the pins 22 and 22a provided for pivotal attachment of the link-arms 23, 23a to the slide-block 21. The ends of said pivot-pins extend outwards from said slide-block in a direction parallel to a diameter of the cylindrical sleeve 1. The action of the driving abutments 28 and 28a is produced directly on the slide-block 21 whereas the action of the abutments 27 and 27a is transmitted to the slide-block by the pivot-pins 22 and 22a.

Without departing either from the scope or the spirit of the invention, alternative forms of construction can be included in the embodiment hereinabove described. Accordingly, it follows that the resilient mechanism 20 can be of different construction. Additional articulated link-arms may thus be provided between the link-arms 23, 23a and the valve extension 8a and continuously urged towards each other by a resilient restoring member. Moreover, the flexible seal 12 can be replaced by an O-ring seal which, instead of cooperating with valve-seats, would cooperate with bearing surfaces of the slide-block of the valve 8, said bearing surfaces being formed on each side of the opening 16. The seals 9 and 12 can also be replaced by sealing members which are deformable in one direction of displacement of the valve and rigid in the other direction. These sealing members being mounted in opposition, the result thereby achieved is that the abutments or stops for limiting the end of travel of the valve would be provided for example at one end by one of the valve-seats 10 or 11 and at the other end by one of the valve-seats 13 or 14 respectively.

Finally, it is possible to place the duct 18 in a plane perpendicular to that of FIGS. 1 and 2 or even to split-up said duct into two opposite ducts in order to achieve an even greater reduction in external bulk of the apparatus.

The invention finds an advantageous application in the field of hydraulic motors of the reciprocating-piston type.

What is claimed is:

1. A driving device of the piston-flowmeter type, in particular for a proportioning pump, said device comprising:
   a cylinder;
   a piston slidably mounted within said cylinder, and provided with at least one motion transmission rod, said piston dividing said cylinder into first and second chambers located on each side of said piston;
   a two-piston four-way distributor controlled by said rod and piston so that, in a first position, a communication is established between said first chamber and a supply of fluid under pressure while communication is established between said second chamber and an outlet nozzle and so that, in a second position, a communication is established between said second chamber and said fluid supply while a communication is established between said first chamber and said outlet nozzle;
   said distributor being provided with a body having two pairs of fixed valve-seats located in concentric relation to a direction which is coaxial with said transmission rod and a tubular valve traversed by said rod, said tubular valve being provided at the ends thereof with two peripheral seals for cooperating alternately with each pair of fixed valve-seats, said tubular valve cooperating in tightly applied relation with at least one valve-seat of each said pair, which valve-seat constitutes an end-of-travel stop for said tubular valve;

two fixed abutments;

a slide-block assembly mounted on said rod and abuttable with said two fixed abutments;

a bistable resilient mechanism coupling said slide-block assembly to said tubular valve, said bistable resilient mechanism having a point of reversal which tends to move said tubular valve away from said slide-block assembly in a first position and to move said tubular valve towards said slide-block assembly in a second position;

two abutments rigidly fixed to said rod in order to move said slide-block assembly in the vicinity of top and bottom dead centers of said piston away from a bearing surface of said slide-block on which a respective abutment is applied by said bistable resilient mechanism and to cause displacement of said slide-block assembly until it passes beyond said point of reversal of said bistable resilient mechanism.

2. A device according to claim 1, wherein said bistable resilient mechanism comprises an assembly of components including two opposite link-arms pivotally attached to said slide-block at one end and a generally U-shaped elastically deformable component, the base of which is rigidly fixed to said valve and each arm of which is pivotally attached to the other end of the corresponding link-arm, said slide-block and said assembly of components being arranged so as to form a polygon in which said slide-block constitutes a convex summit in said first position and a concave summit in said second position.

3. A device according to claim 2, wherein said U shaped component is constituted by a frame spring consisting of two parallel U-shaped lateral elements of resilient wire secured to said valve by means of their bases, and by two cross-pins located at right angles to said lateral elements and connectable to the corresponding arms of the U-shaped elements, said link-arms being pivotally attached to said cross-pins.

4. A device according to claim 3, wherein each lateral element is provided with at least one resilient loop at each corner of the U.

5. A device according to claim 1, wherein said valve is provided with a rigid seal and with a flexible seal capable of flexural deformation in a direction parallel to displacement of said valve.

6. A driving device of the piston-flowmeter type, in particular for a proportioning pump, said device comprising:

a cylinder defining a cylinder chamber;

a piston slidably mounted within said cylinder, and being provided with at least one motion transmission rod, said piston dividing said cylinder into first and second chambers located on each side of said piston;

a two-position four-way distributor provided within a body with two pairs of fixed valve-seats located in concentric relation to a direction which is coaxial with said transmission rod and with a tubular valve traversed by said rod, said tubular valve being provided at the ends thereof with two peripheral seals for cooperating alternately with each pair of fixed valve-seats, said cylinder being constituted by a sleeve closed at one end thereof by said distributor body and open at the other end thereof;

two fixed abutments;

slide block means mounted on said rod for abutting with said two fixed abutments;

a bistable resilient means connected to said tubular valve for coupling said slide block means to said tubular valve, said bistable resilient means having a point of reversal controlled by a moving system;

a bell-shaped casing having an internal space and covering said sleeve, said bell-shaped casing being closed in fluid tight manner by said distributor body and defining an annular space between said sleeve and said casing, said annular space extending completely around said sleeve, said other end of said sleeve opening into said internal space of said bell-shaped casing; and orifices in said distributor body for establishing direct communication with said cylinder chamber or said annular space.

7. A device according to claim 6, wherein said sleeve is of glass.

* * * * *